3,160,660
PROCESS FOR PREPARING NITROSYL
POLYFLUOROACYLATES
Joseph D. Park and Robert W. Rosser, Boulder, Colo.,
assignors to Minnesota Mining and Manufacturing Company, St. Paul, Minn., a corporation of Delaware
No Drawing. Filed June 5, 1961, Ser. No. 114,645
7 Claims. (Cl. 260—545)

This invention relates to a process for the production of nitrosyl acylates and particularly to a process for the production of certain polyfluorinated nitrosyl acylates.

It is known that trifluoronitrosomethane can be produced in small yield by reacting a mixture of silver trifluoroacetate with nitrosyl chloride, heating to remove excess nitrosyl chloride, and pyrolysis of the residue (e.g., J. Banus, J. Chem. Soc., 1953, pp. 3755 to 3761; Haszeldine et al. ibid. page 2075).

It is found that superior yields of trifluoronitrosomethane, of the order of 3 to 4 times those previously known, can by obtained by pyrolysis of purified nitrosyl perfluoroacetate. It has also been found that higher polyfluoronitrosoalkanes can be obtained by the same procedure.

An object of this invention is to provide a process for producing nitrosyl polyfluoroacylates.

Another object of this invention is to provide a useful and convenient process for producing polyfluorinated nitrosyl acylates.

Still other objects will become evident hereinafter.

Broadly speaking, and in accordance with the above and other objects of the invention, it has been found that polyfluorinated nitrosyl acylates are produced in useful amounts by the reaction of a nitrosyl halide with anhydrides of polyfluorinated organic acids. The reaction proceeds according to the equation:

$$(Q_fCO)_2O + NOCl \longrightarrow Q_f\overset{O}{\overset{\|}{C}}-ONO + Q_f\overset{O}{\overset{\|}{C}}-Cl$$

wherein $Q_f$ represents a polyfluorinated radical having from 1 to about 12 carbon atoms. It will be understood that the actual reaction mixture also comprises other substances formed as secondary reaction products and that the equation illustrates a course of the reaction.

The nitrosyl halides which can be employed are nitrosyl chloride as shown in the equation and nitrosyl bromide. In the latter case one product of the reaction will evidently be the acyl bromide.

The polyfluorinated organic acids from which are formed the anhydrides employed in the process of the invention are represented by the formulae:

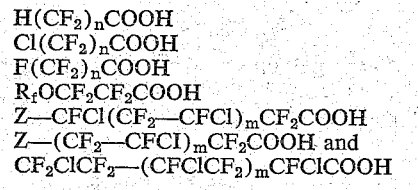

$H(CF_2)_nCOOH$
$Cl(CF_2)_nCOOH$
$F(CF_2)_nCOOH$
$R_fOCF_2CF_2COOH$
$Z\text{—}CFCl(CF_2\text{—}CFCl)_mCF_2COOH$
$Z\text{—}(CF_2\text{—}CFCl)_mCF_2COOH$ and
$CF_2ClCF_2\text{—}(CFClCF_2)_mCFClCOOH$ Z is a perhalomethyl radical having a total atomic weight not greater than 146.5; $R_f$ is a perfluoroalkyl radical having from 1 to 8 carbon atoms; $n$ is an integer from 1 to 12; and $m$ is a number from 0 to 5.

The formulae $Z(CF_2CFCl)_mCF_2COOH$ and

$Z\text{—}CFCl(CF_2\text{—}CFCl)_mCF_2COOH$ are typical of acids derived from oxidation and hydrolysis of polymers including halogenated telomers of such perhalogenated monomers as chlorotrifluoroethylene and the like.

Telomers produced using bromotrichloromethane as a telogen ultimately yield (after oxidation) acids having a terminal trichloromethyl group. Telomers produced using perhalomethanes other than bromotrichloromethanes as telogens also yield acids corresponding to the above formulae. The requirement is that the telogen contain a bromine atom and not produce, at the end of the telomer molecule opposite the bromine atoms, an end group which is more easily hydrolyzed than the CFClBr end group which is readily converted to a carboxylic acid end group during oxidation of the telomer. Suitable telogens other than bromotrichloromethane are the perhalogenated methanes: bromotrifluoromethane, bromochlorodifluoromethane, bromodichlorofluoromethane, dibromodifluoromethane, and dibromochlorofluoromethane. All of these latter telogens produce telomers containing a CFClBr group at one end of the molecule and containing at the opposite end a perhalomethyl group that is a Z group which is not more susceptible to hydrolysis than the aforesaid CFClBr group. Respectively, the Z groups are $CF_3$, $CClF_2$, $CFCl_2$, $CBrF_2$, $CFBrCl$. For convenience, these perhalomethyl terminal groups may be designated collectively as those having a total atomic weight not higher than 146.5, the atomic weight of the bromochlorofluoromethyl group.

These materials can be hydrolyzed, as with fuming sulfuric acid, as described in United States Patents 2,806,665 and 2,806,666, to yield a variety of polyfluorinated acids. Oxidation of the polymers as described in United States Patent 2,863,916 also yields polyfluorinated acids of this type. Such polyfluorinated acids are equivalents for the purposes of this invention.

Acids of the formula:

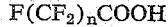

$F(CF_2)_nCOOH$ are simple perfluoroalkanoic acids and are available by electrochemical fluorination of the appropriate alkanoic acid. Such acids are described, for example, in U.S. Patent No. 2,567,011. Acids of the formula $H(CF_2)_nCOOH$ are described in U.S. Patents Nos. 2,559,629 and 2,559,630. Acids of the formula $Cl(CF_2)_nCOOH$ are prepared by oxidation of α-hydro-ω-chloro perfluoroalkanes as described by Severson and Brice in Journal of the American Chemical Society, vol. 80, pages 2313 to 2316 (1958). Acids of the type $R_fOCF_2CF_2COOH$ and from them the anhydrides are available as described in U.S. Patent No. 2,713,593.

The acids are converted to anhydrides by any convenient method known to those skilled in the art, for example, reaction of the acyl chloride with the sodium salt. The anhydrides are then utilized in the process of the invention. Certain of the telomer acids of chlorotrifluoroethylene are formed as anhydrides as shown in U.S. Patent No. 2,806,865 and may be isolated as such.

The process for the production of nitrosyl polyfluoroacylates is carried out under anhydrous conditions, at temperatures in the range of about −80° to +100° C. Preferably temperatures in the range of about 10° to 50° C. are employed. Normal working pressures are satisfactory. Irradiating the reaction mixtures with ultraviolet or actinic light is found to increase the speed of reaction.

The nitrosyl polyfluoroacylates thus prepared (which may also be designated as polyfluoroacylnitrites) are readily isolated in stable form from the reaction mixture by fractionation under reduced pressure at temperatures below about 90° C.

The nitrosyl polyfluoroacylates as prepared by the process of the invention are yellow liquids which can be distilled under reduced pressures at temperatures below about 90° C. In general, the boiling points of these liquids at atmospheric pressure are above the temperatures at which they are pyrolyzed to form the corresponding nitrosopolyfluoroalkanes, according to the reaction:

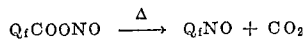

$$Q_fCOONO \xrightarrow{\Delta} Q_fNO + CO_2$$

in which $Q_f$ has the above-designated significance. They are, however, stable at room temperature, about 25° C., for indefinite periods and even at 100° C. for periods of at least a few minutes. They are thus quite different from the nitrosyl hydrocarbon acylates described by Francesconi and Cialdea (Gazzeta Chimica Italiana, vol. 34, Part I, page 435 (1904). They are apparently not affected by light of ordinary intensities for prolonged periods, although storage in tinted glass or opaque containers is preferable since it is known that the compounds absorb visible and ultraviolet light of certain frequencies. If overheated, i.e., at temperatures above about 100° C., they may decompose violently. Thus, greater stability over the heretofore known unfluorinated materials depends upon the presence of a plurality of fluorine atoms in the molecule.

The nitrosyl polyfluoroacylates react vigorously with water and hydroxylated solvents, e.g., alcohols, to form the corresponding polyfluoroalkanoic acid. They react readily with sodium chloride to form nitrosyl chloride and, therefore, in determining the infrared absorption spectra of these compounds it is necessary to employ cells having silver chloride windows. The compounds exhibit absorption maxima at about 5.07 and 5.85 microns which correspond to nitrosyl and carbonyl groups, respectively.

The compounds are also very reactive with metals. For example, they react with metals such as zinc, lead, aluminum, nickel, iron, mercury, copper and silver to form the salt of the polyfluoroalkanoic acid. They do not react with platinum, and hence platinum or platinum-lined equipment can be used in working with the compounds.

The nitrosyl polyfluoroacylates as produced by the process of the invention are particularly useful as intermediates for the preparation of the corresponding nitroso perfluoroalkanes. Pyrolysis of the nitrosyl compounds produces the nitroso polyfluoroalkanes in good yield. It will be understood that this term is intended to embrace also the series of polyfluorinated nitroso compounds containing an oxygen atom in the chain.

The nitroso polyfluoroalkanes formed by the pyrolysis of the corresponding nitrosyl polyfluoroacylates are useful comonomers with perfluoroolefins for the preparation of elastomers having advantageous properties. For example, the copolymer of trifluoronitrosomethane and tetrafluoroethylene is a rubber with good low-temperature flexibility and excellent solvent resistance. The other nitroso polyfluoroalkanes which are produced by pyrolysis of the compounds prepared by the process of this invention likewise serve as comonomers with tetrafluoroethylene, to produce useful copolymers.

Now having described the process of the invention in broad terms, it is more specifically illustrated by means of particular examples serving to show the best mode presently contemplated of carrying out the invention without thereby limiting the same. In these examples all parts are by weight unless otherwise specified.

EXAMPLE 1

Twenty-two grams (0.3 mole) of nitrosyl chloride and 45 grams (0.33 mole) of perfluoroacetic anhydride are introduced into an evacuated 7-liter round-bottomed flask in the vapor state. The gases are condensed by cooling the flask with Dry Ice. The resulting slurry is allowed to warm to about 25° C. and is then maintained for 48 hours with occasional shaking while heating and irradiating with a 300 watt incandescent lamp positioned a few inches from the flask. The excess nitrosyl chloride is removed by permitting the reaction mixture to warm to room temperature and collecting the nitrosyl chloride in a suitably cooled trap. The residue is distilled under about 0.1 mm. Hg pressure and condensed in a receiver cooled in Dry Ice-acetone. Redistillation gives 10.1 parts of substantially pure nitrosyl trifluoroacetate boiling at about 46° C. at 80 mm. Hg pressure, in yield of approximately 70 percent of theoretical. $d_4^{23}=1.595$;

$$n_D^{25}=1.3772$$

A major portion of the unreacted material is identified as the perfluoroacetic acid anhydride, which can be recycled.

*Analysis.*—Calculated for: $C_2F_3NO_3$: C, 16.8%; F, 39.85%; N, 9.7%. Found: C, 17.0%; F, 39.72%; N, 9.79%.

The infrared spectrum is found to be indentical with that of material produced by the method of Banus or Haszeldine.

EXAMPLE 2

When the above procedure is repeated employing the anhydrides of perfluoropropionic acid and perfluorobutyric acid, the products are found to be respectively nitrosyl perfluoropropionate ($C_2F_5COONO$), B.P. 58° C. at about 80 mm. Hg, $d_4^{25}$—1.642; $n_4^{25}$—1.3578.

*Analysis.*—Calculated for: $C_3F_5NO_3$: C, 18.66%; N, 7.26%; F, 49.22%. Found: C, 18.71%; N, 7.17%; F, 49.03% and nitrosyl perfluorobutyrate ($C_3F_7COONO$) boiling at about 29° C. at 6 mm. Hg, $d_4^{23}$—1.685 and $n_D^{24}$—1.3470.

*Analysis.*—Calculated for: $C_4F_7NO_3$: C, 19.75%; N, 5.75%; F, 54.73%. Found: C, 20.03%; N, 5.71%; F, 55.10%.

Additional examples of nitrosyl perfluoroacylates and starting acids of the formula $X(CF_2)_nCOOH$ wherein X is a member of the group consisting of H, Cl and F useful for the purposes of the invention are set forth in the following table. The procedure used in the reaction is in each case that set forth above in Example 1. An excess of nitrosyl chloride is employed. The boiling points (uncorrected) of the products are noted.

*Table I*

| Polyfluoroalkanoic Acid (used as the anhydride) | Nitrosyl Perfluoro acylate obtained | B.P., ° C. |
|---|---|---|
| $C_5F_{11}COOH$ | $C_5F_{11}COONO$ | 65/10 mm. |
| $C_7F_9COOH$ | $C_7F_9COONO$ | 51/1 mm. |
| $C_9F_{19}COOH$ | $C_9F_{19}COONO$ | 68/1 mm. |
| $H(CF_2)_6COOH$ | $H(CF_2)_6COONO$ | 65/1.5 mm. |
| $H(CF_2)_4COOH$ | $H(CF_2)_4COONO$ | 69/10 mm. |
| $H(CF_2)_{11}COOH$ | $H(CF_2)_{11}COONO$ | 97/1 mm. |
| $Cl(CF_2)_4COOH$ | $Cl(CF_2)_4COONO$ | 70/10 mm. |
| $Cl(CF_2)_6COOH$ | $Cl(CF_2)_6COONO$ | 55/1 mm. |

The process works satisfactorily when nitrosyl bromide is employed in place of nitrosyl chloride, in approximately the same molar amounts.

EXAMPLE 3

The production of perfluoronitrosyl acylates having the general formula:

$$R_fO—CF_2CF_2COONO$$

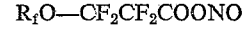

wherein $R_f$ is a perfluoroalkyl radical having from 1 to 8 carbon atoms is carried out as follows. The acids and their anhydrides are prepared by the method described in United States Patent No. 2,713,593.

A round-bottomed flask provided with a magnetic stirrer, suitable provisions for anhydrous introduction of the reactants and an outlet protected by a drying tube and extending through a suitable trap is mounted in a solid carbon dioxide-acetone bath. After the flask has been flushed with dry nitrogen, it is charged with 42.6 grams (0.65 mole) of nitrosyl chloride and 0.10 mole of perfluoro(β-ethoxypropionic) anhydride are then added thereto in portions over a period of about 10 minutes, while stirring. The reaction mixture is stirred at a temperature in the range of about —20° C. to —40° C. for about 2 hours and is then permitted to warm to room temperature, during which time the excess of nitrosyl chloride distills over into a solid carbon dioxide-cooled trap. The residue remaining in the reaction flask is then distilled fractionally under reduced pressure, and about 26.5 grams of nitrosyl perfluoro β-ethoxypropionate are recovered, B.P. 44° C. at about 14 mm. Hg pressure.

Further examples of the perfluoronitrosyl acylates characterized by the presence of an ether oxygen are set forth in the following table showing the starting materials and the products obtained. The process is that set forth above.

Table II

| Polyfluoro Acid (employed as anhydride) | Nitrosyl Perfluoroacylate obtained | B.P., ° C. |
|---|---|---|
| $CF_3OC_2F_4COOH$ | $CF_3OC_2F_4COONO$ | 55/20 mm. |
| $n-C_3F_7OC_2F_4COOH$ | $n-C_3F_7OC_2F_4COONO$ | 63/10 mm. |
| $n-C_5F_{11}OC_2F_4COOH$ | $n-C_5F_{11}OC_2F_4COONO$ | 53/1.5 mm. |
| $n-C_6F_{13}OC_2F_4COOH$ | $n-C_6F_{13}OC_2F_4COONO$ | 56/1 mm. |
| $n-C_8F_{17}OC_2F_4COOH$ | $n-C_8F_{17}OC_2F_4COONO$ | 73/1 mm. |

EXAMPLE 4

Acids corresponding to the formula:

$$ZCFCl(CF_2-CFCl)_mCF_2COOH$$

wherein Z and m have the same significance as set forth hereinabove as well as their anhydrides can be prepared according to the procedures set forth in United States Patent No. 2,806,866.

The process set forth in Example 1 is carried out, employing 0.12 mole of 3,4-dichloropentafluoro butyric anhydride and 57 grams (0.87 mole) of nitrosyl chloride. Nitrosyl 3,4-dichloropentafluorobutyrate, B.P. 63° C. at 5.5 mm. Hg pressure, is recovered from the reaction mixture.

A repetition of the procedure, using 0.6 mole of 3,5,6-trichlorooctafluorocaproic anhydride and 57 grams of nitrosyl chloride provides nitrosyl 3,5,6-trichlorooctafluorocaproate, boiling at 73° C. at about 0.5 mm. Hg pressure.

Further examples of polyfluoronitrosyl acylates of this type, and the starting materials therefor, are set forth in the following table. The reaction procedure used is the same as that shown above.

Table III

| Polyfluoro Acid Anhydride Employed | Nitrosyl Polyfluoro Acylate Obtained |
|---|---|
| $(CF_2Cl-CFCl(CF_2CFCl)_2CF_2CO)_2O$ | $CF_2Cl-CFCl(CF_2CFCl)_2CF_2COONO$* |
| $(CF_2Cl-CFCl(CF_2CFCl)_4CF_2CO)_2O$ | $CF_2Cl-CFCl(CF_2CFCl)_4CF_2COONO$** |
| $(CF_2ClCF_2CFClCO)_2O$ | $CF_2ClCF_2CFClCOONO$ |

*B.P. 103° C./0.5 mm.
**Distils below 100° C. at very low pressures.

EXAMPLE 5

Polyfluorinated acids corresponding to the formula:

$$Z(CF_2-CFCl)_mCF_2COOH$$

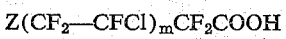

wherein Z and m have the significance set forth above, and their anhydrides, are prepared by the process described in United States Patent No. 2,806,865.

The polyfluoronitrosyl acylates corresponding to those acids which contain odd numbers of carbon atoms are prepared by the same procedure as that used for the even-numbered acids of this type, as described above.

Examples of the starting materials and the nitrosyl polyfluoro acylates thus obtained are set forth in the following table:

Table IV

| Polyfluoro Acid Anhydrides | Nitrosyl Polyfluoro Acylate Obtained | |
|---|---|---|
| $(CCl_3-CF_2-CFCl-CF_2-CO)_2O$ | $CCl_3-CF_2-CFCl-CF_2COONO$ | (a) |
| $(CCl_3(CF_2-CFCl)_2-CF_2-CO)_2O$ | $CCl_3(CF_2-CFCl)_2CF_2COONO$ | (b) |
| $(CCl_3(CF_2-CFCl)_3-CF_2-CO)_2O$ | $CCl_3(CF_2-CFCl)_3CF_2COONO$ | (c) |
| $(CCl_3(CF_2-CFCl)_5-CF_2-CO)_2O$ | $CCl_3(CF_2-CFCl)_5CF_2COONO$ | (d) |

(a) B.P. 75° C./0.5 mm. (uncorr.); (b) B.P. 100° C./0.5 mm.; (c) and (d) boil below 100° C. at very low pressures. Recovery of these high boiling products in purity sufficient for further reaction can be accomplished by distilling off all the other components of the reaction mixture under reduced pressure; the residue is the desired product.

What is claimed is:

1. A process for the production of a fluorinated nitrosyl acylate selected from the group consisting of:

$H(CF_2)_nCOONO$,
$Cl(CF_2)_nCOONO$,
$F(CF_2)_nCOONO$,
$R_fOCF_2CF_2COONO$,
$Z-CFCl(CF_2-CFCl)_mCF_2COONO$,
$Z-(CF_2-CFCl)_mCF_2COONO$ and
$CF_2ClCF_2(CFClCF_2)_mCFClCOONO$ wherein Z is a perhalomethyl radical having a total atomic weight not greater than 146.5, $R_f$ is a perfluoroalkyl radical having from 1 to 8 carbon atoms, n is an integer from 1 to 12, and m is a number from 0 to 5; which comprises the step of treating the anhydride of an acid selected from the group consisting of:

$H(CF_2)_nCOOH$,
$Cl(CF_2)_nCOOH$,
$F(CF_2)_nCOOH$,
$R_fOCF_2CF_2COOH$,
$Z-CFCl(CF_2-CFCl)_mCF_2COOH$,
$Z-(CF_2-CFCl)_mCF_2COOH$ and
$CF_2ClCF_2(CFClCF_2)_mCFClCOOH$ wherein Z, $R_f$, n and m have the same significance as before, with a nitrosyl halide of the group consisting of nitrosyl chloride and nitrosyl bromide, under anhydrous conditions at a temperature in the range of about −80° C. to about 100° C.

2. A process for the production of a fluorinated nitrosyl acylate selected from the group consisting of:

$H(CF_2)_nCOONO$,
$Cl(CF_2)_nCOONO$,
$F(CF_2)_nCOONO$,
$R_fOCF_2CF_2COONO$,
$Z-CFCl(CF_2-CFCl)_mCF_2COONO$,
$Z-(CF_2-CFCl)_mCF_2COONO$ and
$CF_2ClCF_2(CFClCF_2)_mCFClCOONO$

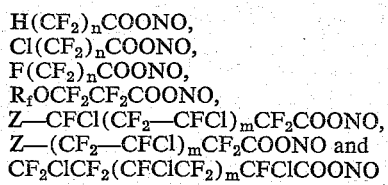

wherein Z is a perhalomethyl radical having a total atomic weight not greater than 146.5, $R_f$ is a perfluoroalkyl radical having from 1 to 8 carbon atoms, n is an integer from 1 to 12, and m is a number from 0 to 5; which comprises the step of treating the anhydride of an acid selected from the group consisting of:

H(CF$_2$)$_n$COOH,
Cl(CF$_2$)$_n$COOH,
F(CF$_2$)$_n$COOH,
R$_f$OCF$_2$CF$_2$COOH,
Z—CFCl(CF$_2$—CFCl)$_m$CF$_2$COOH,
Z—(CF$_2$—CFCl)$_m$CF$_2$COOH and
CF$_2$ClCF$_2$(CFClCF$_2$)$_m$CFClCOOH wherein Z, R$_f$, n and m have the same significance as before, with a nitrosyl halide of the group consisting of nitrosyl chloride and nitrosyl bromide, under anhydrous conditions at a temperature in the range of about 10° C. to about 50° C.

3. The process for the production of a fluorinated nitrosyl acylate, which comprises the step of treating the anhydride of an acid derived from a telomer of chlorotrifluoroethylene by oxidation and hydrolysis, said acid having up to 5 chlorotrifluoroethylene repeating units and containing a terminal perhalomethyl group having total atomic weight not higher than 146.5; with a nitrosyl halide of the group consisting of nitrosyl chloride and nitrosyl bromide, under anhydrous conditions at a temperature in the range of about —80° C. to about 100° C.

4. A process for the production of a fluorinated nitrosyl acylate of the formula R$_f$COONO wherein R$_f$ is a perfluoroalkyl radical having from 1 to 12 carbon atoms; which comprises the step of treating the anhydride of an acid of the formula R$_f$COOH wherein R$_f$ has the same significance as before, with a nitrosyl halide of the group consisting of nitrosyl chloride and nitrosyl bromide, under anhydrous conditions at a temperature in the range of about —80° C. to about 100° C.

5. A process for the production of a fluorinated nitrosyl acylate of the fomula

R'$_f$COONO wherein R'$_f$ represents an ω-hydroperfluoroalkyl radical having from 1 to 12 carbon atoms, which comprises the step of treating the anhydride of an acid of the formula R'$_f$COOH wherein R'$_f$ has the same significance as before, with a nitrosyl halide of the group consisting of nitrosyl chloride and nitrosyl bromide, under anhydrous conditions at a temperature in the range of about —80° C. to about 100° C.

6. A process for the production of a fluorinated nitrosyl acylate of the formula R''$_f$COONO wherein R''$_f$ represents an ω-chloroperfluoroalkyl radical having from 1 to 12 carbon atoms, which comprises the step of treating the anhydride of an acid of the formula R''$_f$COOH wherein R''$_f$ has the same significance as before with a nitrosyl halide of the group consisting of nitrosyl chloride and nitrosyl bromide, under anhydrous conditions at a temperature in the range of about —80° C. to about 100° C.

7. A process for the production of a fluorinated nitrosyl acylate of the formula:

R$_f$OCF$_2$CF$_2$COONO wherein R$_f$ is a perfluoroalkyl radical having from 1 to 8 carbon atoms; which comprises the step of treating the anhydride of an acid of the formula:

R$_f$OCF$_2$CF$_2$COOH wherein R$_f$ has the same significance as before, with a nitrosyl halide of the group consisting of nitrosyl chloride and nitrosyl bromide, under anhydrous conditions at a temperature in the range of about —80° C. to about 100° C.

References Cited in the file of this patent

UNITED STATES PATENTS 3,040,085    Andreades _____ June 19, 1962
3,072,705    Park et al. _____ Jan. 8, 1963

OTHER REFERENCES

Bank et al.: Proc. Chem. Soc., February 1961, pages 64–5.